Patented Sept. 3, 1935

2,012,952

UNITED STATES PATENT OFFICE 2,012,952

VERMICULITE PASTE FOR SEALING PISTONS

Harold S. Brinker and William B. Thomas, Denver, Colo., assignors to Motor Seal Corporation, Denver, Colo., a corporation of Colorado No Drawing. Application October 30, 1933, Serial No. 695,842

3 Claims. (Cl. 106—8)

This invention relates to a method and a product for producing gas tight seals between relatively moving bodies such as between the piston and cylinder of an engine or between the piston rings and the piston ring grooves in the pistons.

It is well known that internal combustion engines of the type employed in automobiles are operated under conditions that produce rapid wear of the piston rings and the cylinder surfaces with the result that the seal between the piston and the cylinder frequently becomes defective to such an extent that the gases produced by the burning of the gaseous mixtures escape from the combustion chamber into the crank case with a resultant loss of power. In addition to the loss of power, leaky piston rings permit oil to be pumped into the combustion chamber, thereby increasing the amount of carbon produced and increasing the cost of lubricating the engine.

When internal combustion engines have become leaky as above intimated, it is usually necessary to remove the pistons and supply them with new piston rings and it is also frequently necessary to rebore the cylinders which necessitates the use of oversized pistons. Such reconditioning of an engine is expensive and is only temporary because the reconditioned pistons and cylinders will soon wear away and become leaky. Another objection to the mechanical reconditioning of the cylinder is that when they are rebored, the hardened inner surface is removed so as to leave only the soft cast iron that then wears away faster than the original surface.

We have discovered that if a paste is formed from a mixture of unexfoliated and exfoliated vermiculite and oil and this paste introduced into cylinders of an internal combustion engine which is then permitted to idle for a few minutes, the paste will flow into the space between the cylinder wall and the piston and be forced downwardly by the pressure so as to pass into the space between the sides of the piston rings and the sides of the piston ring grooves and that if the parts are then heated to a temperature higher than that required for exfoliation of the vermiculite, the unexfoliated particles of vermiculite that have been carried into the cracks and spaces through which gases leaked will expand and form an oil and gas tight seal.

Owing to the lubricating properties of roasted or exfoliated vermiculite, the surfaces separated by a layer of this material will move relative to each other quite freely as the vermiculite acts as an effective lubricant.

In order to prepare the paste which is used in the sealing operation, ordinary vermiculite, which is sometimes referred to as Jeffersite, is taken from the mine and cleaned so as to remove as much as possible of the grit and sand that might be present. After the first cleaning, the vermiculite is ground to a size that will barely pass through a half inch mesh screen and is then subjected to a differential screening effect whereby the grit and foreign particles that have been reduced to a small size, will be separated from the larger vermiculite particles. After this screening operation, the vermiculite, which is then quite free from foreign matter, is ground to a fine powder and subjected to a screening operation and employing for this purpose a 30 mesh screen that will limit the maximum dimension of the particles to those permitted to pass through this screen. The vermiculite that passes through the screen will then consist of particles varying in size from the very smallest to the largest that will pass through the screen.

The screened vermiculite is now mixed with powdered, roasted or exfoliated vermiculite and the proportions of unexfoliated vermiculite to exfoliated vermiculite may vary somewhat, but preferably the roasted vermiculite comprises about one-third of the mixture, the balance being unexfoliated vermiculite. The mixture of roasted and unroasted vermiculite is now mixed with a mineral oil of any suitable grade or quality, but a very satisfactory paste or mixture has been obtained by employing steam engine valve oil with which may be mixed a small percentage of penetrating oil. The oil and the mixture of powdered vermiculite are thoroughly stirred so as to form a homogeneous paste which can be placed in collapsible tubes in which the paste is sold and from which it is dispensed.

When an engine is to be treated by the process defined in this application, the spark plugs are removed while the engine is still hot and a quantity of the paste is introduced into each cylinder. The spark plugs are now replaced, after which the engine is started and permitted to idle for a few minutes, five minutes has been found as sufficient for this purpose. During the idling of the engine the pistons and the cylinder walls are kept hot, but at a temperature below that necessary to exfoliate the vermiculite, the heat, however, is sufficient to make the oil flow freely and this carries the vermiculite to the sides of the pistons where the mixture flows downwardly between the piston and the cylinder walls and into the space between the piston rings and the sides of the piston ring grooves. Some of the paste will flow through the space between the inside of the piston ring and the bottom of the groove and thence outwardly between the lower wall of the upper piston ring and the corresponding side of the piston ring groove. After the engine has been idled so as to allow the paste to flow into the openings to be sealed, the engine is loaded so that the temperature will increase during operation and it has been found that when an automobile or other internal combustion engine is operating at full load, the temperature increases to such an extent that the unroasted particles of vermiculite exfoliates It is well known that vermiculite has the property of expanding to many times its original size when heated above a certain temperature and since vermiculite is formed from a large number of thin layers which become separated by heating, the result of the application of heat is referred to as exfoliation. When the unroasted vermiculite which has been carried into the openings through which the gas and oil formerly leaked, begins to exfoliate, these openings become completely filled with exfoliated vermiculite with the result that a very effective seal is formed, especially between the sides of the piston rings and the sides of the piston ring grooves.

When the engine to be sealed is an internal combustion engine, the necessary heat can easily be obtained, but if the process is to be applied to a steam engine, the use of ordinary saturated steam will not raise the temperature sufficiently to produce exfoliation and therefore it is necessary to employ highly super-heated steam until the parts become sufficiently heated to exfoliate the vermiculite.

By having the particles of vermiculite of different size, it is apparent that where the space to be sealed is very small, only the smaller particles will enter, but where the space is large, a quantity of larger vermiculite particles will enter, and in this way the quantity of vermiculite will be properly proportioned to the openings to be sealed.

From experience it has been found that when engines that are leaky and which are worn to such an extent that "piston slap" takes place during operation, are treated as above described the openings through which the gas and oil pass will be very effectively sealed and enough of the vermiculite will accumulate around the piston to prevent "piston slap".

It is evident from the above that the method of sealing herein described makes it possible to cure leaky engines very quickly and very cheaply and thus affords a great saving in the operation of the engine.

The function of the oil is to serve as a carrier for transferring the mixture of roasted and unroasted vermiculite to the places where it is needed and when the temperature is raised so as to exfoliate the unroasted vermiculite the oil volatilizes and leaves the solid material in place.

The presence of roasted vermiculite with the unroasted vermiculite has been found to be advantageous because it is usually in the form of a fine powder that penetrates into places where the unexfoliated vermiculite will not pass due to the expanding action of the heat.

Particular attention is directed to the fact that the paste contains a large proportion of unroasted vermiculite particles. It is well understood that unexfoliated vermiculite is not possessed of any lubricating properties and its presence between moving surfaces would be highly objectionable. The reason why unroasted vermiculite can be used for the purpose here under consideration is that its properties are soon changed by the action of the heat and after it has been heated and exfoliated, it becomes a lubricant. The paste should have sufficient thickness to prevent the solid particles from settling.

This application is a continuation, in part, of application, Serial No. 673,566, filed May 29, 1933.

Having described the invention what is claimed as new is:

1. A paste for use in forming seals between relatively movable surfaces of heated bodies consisting of exfoliated and unexfoliated vermiculite particles in the proportion of one part of the former to three parts of the latter mixed with a sufficient quantity of oil to form a paste.

2. A paste for use in forming seals between relatively movable surfaces of heated metal bodies consisting of exfoliated and unexfoliated vermiculate particles of 30 mesh and smaller, in the proportion of one part of the former to three parts of the latter, mixed with a sufficient quantity of oil to form a paste.

3. A paste for use in forming seals between relatively movable surfaces of heated bodies consisting of a mixture of exfoliated and unexfoliated vermiculite particles mixed with a lubricant.

HAROLD S. BRINKER.
WILLIAM B. THOMAS.